Feb. 11, 1947. L. B. BUSHUE 2,415,577
SEEDER
Filed Aug. 26, 1944 2 Sheets-Sheet 1

Inventor
Lee B Bushue
By
Glenn L. Fish
Attorney

Feb. 11, 1947.   L. B. BUSHUE   2,415,577
SEEDER
Filed Aug. 26, 1944   2 Sheets—Sheet 2

Inventor
Lee B. Bushue
By
Glenn L. Fish
Attorney

Patented Feb. 11, 1947

2,415,577

UNITED STATES PATENT OFFICE 2,415,577

SEEDER

Lee B. Bushue, Spokane, Wash.

Application August 26, 1944, Serial No. 551,349

5 Claims. (Cl. 111—34)

This invention relates to agricultural implements and more particularly to a seeder of the wheeled type adapted to be pushed forwardly by the person operating the seeder.

One object of the invention is to provide a seeder having a hopper from which seeds are delivered, one at a time, to a tube through which the seeds pass and into a trench opened by a shovel in advance of the lower end of the tube. Since the seeds are delivered to the tube individually at predetermined time intervals, single seeds may be planted at predetermined distances apart and this not only saves seeds but also eliminates the necessity of thinning a row of growing plants.

Another object of the invention is to provide a seeder wherein the seeds are delivered from the hopper by a tubular seed carrier through which air is sucked so that the individual seeds will be held upon the tubular carrier until removed therefrom by a brush which delivers the seeds to the tube through which they pass to the trench.

Another object of the invention is to cause the means for shifting the seed carrying tube and the bellows for creating suction through said tube to be operated in timed relation to each other and thus the seeds caused to be individually planted at proper distances apart in a row.

Another object of the invention is to provide a planter which may be readily operated by a person using manually operated implements, said seeder having a shovel for opening a trench, seed-delivering mechanism operated from a shaft carrying wheels for the machine, and means for covering the seeds after they have been deposited in the trench.

Figure 1:
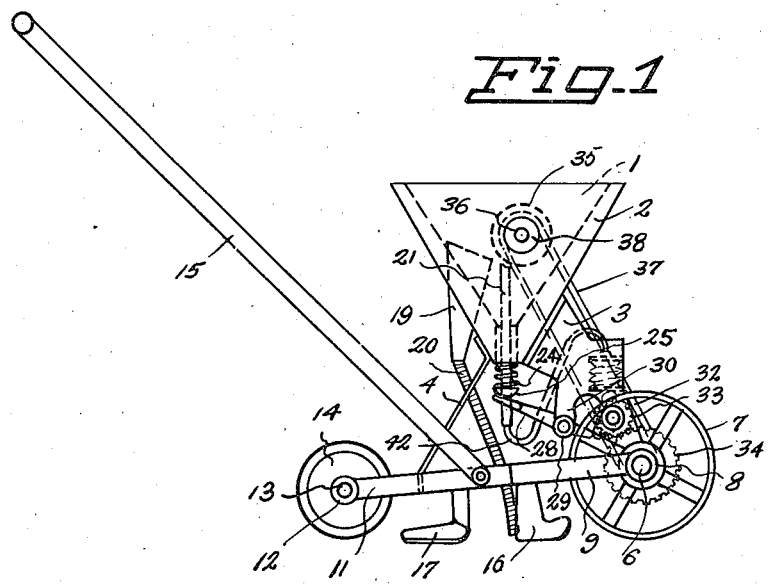
Fig. 1 is a side elevation of the improved seeder.
Figure 2:
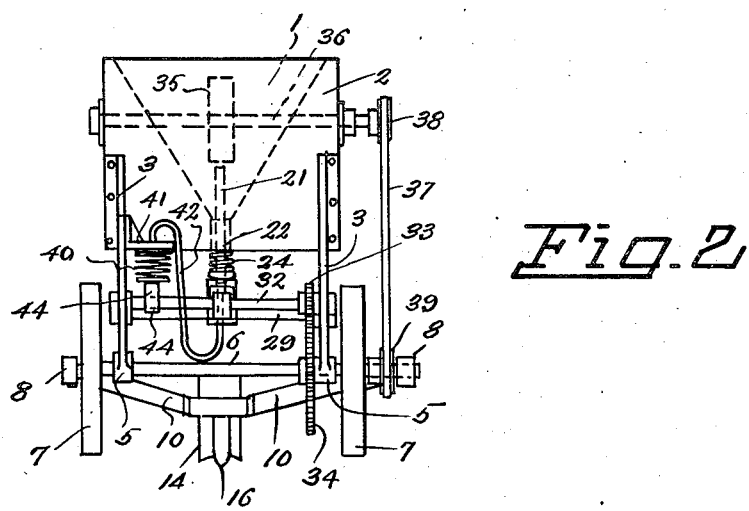
Fig. 2 is a view looking at the front of the seeder.
Figure 3:
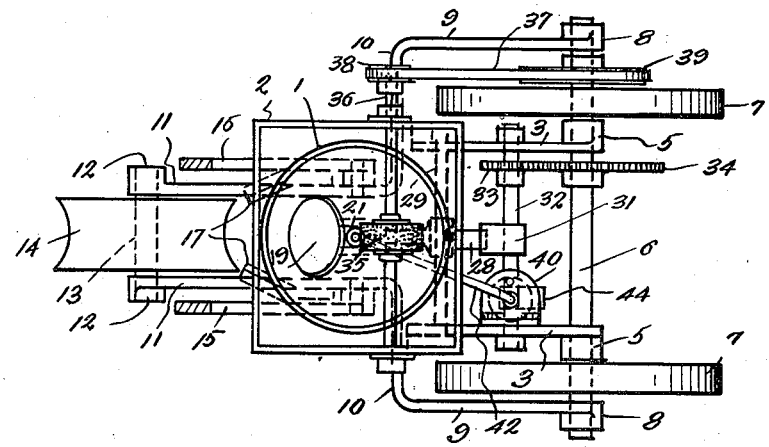
Fig. 3 is a top plan view of the seeder.
Figure 4:
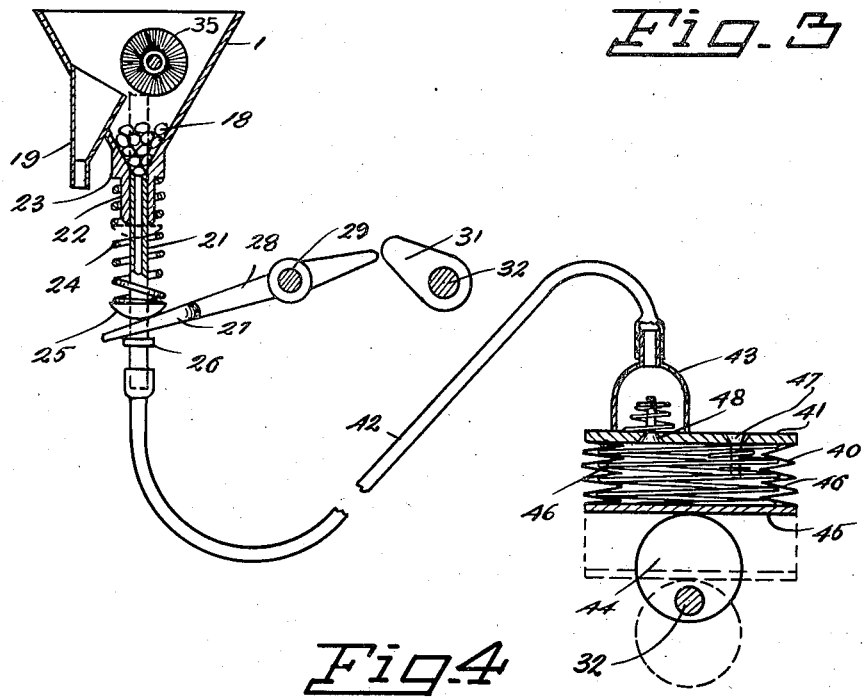
Fig. 4 is a fragmentary view of the seed-delivering mechanism.

This improved seeder has a seed-carrying hopper 1 which tapers toward its lower end and is preferably funnel-shaped. This hopper is mounted in a frame 2 carried by front and rear brackets 3 and 4, the front brackets being formed at their lower ends with bearing sleeves 5 to rotatably receive a shaft 6 carrying the front wheels 7. This shaft is also rotatably mounted through bearings 8 at front ends of the side bars 9 of the carriage for the seeder. Intermediate the length of the machine the side bars are bent inwardly toward each other, as shown at 10, and then rearwardly to provide rear portions 11 terminating in bearings 12 to receive the axle 13 of the rear wheel 14. This rear wheel has a wide transversely concaved rim and serves to press covered seeds into the ground as well as serving to support the rear end of the machine. The rear brackets 4 are carried by the rear portions 11 of the side bars 9, as are also handles 15 by which the machine is pushed forwardly across a field to be planted. Adjacent forward ends of the rear portions 11 of the side bars there is mounted a shovel 16 for opening a trench to receive the seeds and in rearwardly spaced relation to this shovel are scraper blades 17 for pushing dirt back into the trench and covering seeds deposited therein, the wheel 14 then moving along the filled-in furrow and pressing the disk to pack the seeds into the ground.

A quantity of seeds 18 are placed in the hopper 1 and are to be individually delivered therefrom into the funnel-shaped throat 19, from which extends a tube 20 having its lower end terminating back of but close to the shovel so that, as the machine is propelled across a field and a furrow opened by the shovel, the seeds will be deposited in the furrow. In order to individually deliver seeds from the hopper into the throat 19, there has been provided a tubular plunger 21 which is vertically disposed and slidable through a neck 22 extending downwardly from the lower end of the hopper. The upper portion of the neck is thickened to form an outstanding annular shoulder 23 engaged by the upper end of a coil spring 24 which is disposed about the tube and has its lower end bearing against a collar 25 and urges the plunger downwardly. A smaller collar 26 surrounds the plunger below the collar 25 and between these collars the plunger is straddled by fork 27 at the rear end of a lever 28 which is pivotally mounted upon a shaft 29. This shaft is mounted between bearings 30 depending from the brackets 3 and the lever projects forwardly from shaft 29 so that its front end may be intermittently engaged by a cam 31 fixed to a shaft 32. The shaft 32 is rotatably mounted between the brackets 3 in advance of shaft 29 and carries a gear 33 meshing with a larger gear 34 carried by shaft 6. As the machine is moved forwardly, the shaft 6 turns with the wheels 7, and rotary motion is transmitted to shaft 32 by the gears so that the cam 31 turns about the shaft 32 and intermittently pressed upon the front end of lever 28. As the front end of the lever is depressed, its forked rear end is swung upwardly and the plunger raised, carrying with it one seed upon its upper end. As the plunger reaches the upper end of its path of movement, the seeding resting thereon is brushed off by the rotary brush 35 and into the throat 19, from which is passes through tube 20 and drops into the furrow back of the shovel 16. The furrow is then filled in by the scraper blades 17 and pressure applied by the rear wheel to pack the soil about the seed. By varying the ratio of the gears 33 and 34, the time interval between movements of the plunger may be changed and the distance between seeds in a row controlled. The brush is carried by a shaft 36 journaled through the hopper and driven by a belt 37 trained about pulleys 38 and 39.

Since only one seed is to be removed from the hopper at a time, it is important to prevent the seeds from being dislodged from the upper end of the plunger as the plunger is shifted upwardly and in order to do this, there has been provided a bellows 40 having its upper board 41 mounted at the inner side of one bracket 3. A rubber tube 42 leads from the lower end of the plunger to the nipple 43 of the bellows and as shaft 32 turns, a cam 44 carried thereby will move downwardly so that the lower board 45 of the bellows may be depressed by the springs 46 within the bellows and suction created through the tube. This suction very effectually holds a seed in place upon the upper end of the plunger but the brush may sweep the seed from the plunger and into the throat. As the plunger moves downwardly the lower board of the bellows is forced upwardly by the cam and air is pumped through the tube 42 and the plunger to dislodge any material which may have a tendency to clog the plunger. Valves 47 and 48 which are inwardly and outwardly opening valves, are mounted through openings in the upper board 41 of the bellows and insure proper operation of the bellows. Since the bellows are operated by a cam carried by shaft 32 and the lever 28 is actuated by a cam carried by this shaft, the plunger and the bellows will be actuated in proper timed relation to each other. While the seeding machine has been shown equipped with a single hopper and associated mechanism for depositing seeds in a single row as the machine is moved across a field, it will be understood that, by providing additional hoppers and associated mechanism, more than one row of seeds may be planted at one time. It will also be obvious that a large seeding machine may be drawn by horses or by a tractor.

Having thus described the invention, what is claimed is:

1. In a seeder, a carriage, a shovel for opening a furrow, a shaft rotatably mounted transversely of the frame, a hopper, a throat leading from said hopper above the bottom thereof, means extending downwardly from said throat for depositing seed in the furrow back of said shovel, a tubular lifter for individually removing seeds from a mass of seeds in the hopper, operating means for vertically reciprocating said seed lifter driven from said shaft, means driven from said shaft for creating suction downwardly through said lifter as the lifter moves upwardly to hold seeds upon the lifter, and means for dislodging seeds from the lifter and into said throat.

2. In a seeder, a carriage, a shovel for opening a furrow, a main shaft rotatably mounted transversely of the frame, a hopper, a throat leading from said hopper above the bottom thereof, means extending downwardly from said throat for depositing seed in the furrow back of the shovel, a tubular plunger slidable vertically through the bottom of said hopper for lifting seeds from a mass of seeds in the hopper, a driven shaft rotated from the main shaft, means actuated from said driven shaft for reciprocating said plunger vertically, means actuated from said driven shaft for creating downward suction through said plunger as the plunger moves upwardly and holding seeds upon the upper end of the plunger, and a brush in said hopper for dislodging seeds from said plunger when the plunger is in raised position driven from said main shaft.

3. In a seeder, a carriage, a shovel for opening a furrow, a main shaft rotatably mounted transversely of the frame, a hopper, a throat leading from said hopper above the bottom thereof, a tube extending downwardly from said throat for depositing seed in the furrow back of the shovel, a plunger slidable vertically through the bottom of said hopper for lifting seeds from a mass of seeds in the hopper, a lever for shifting said plunger upwardly, a driven shaft rotated from the main shaft, a cam carried by said driven shaft for actuating said lever, said plunger being of tubular formation, a bellows, a flexible tube connecting said bellows with the lower end of the tubular plunger, a cam carried by the driven shaft and actuating said bellows in timed relation to movement of the plunger to create suction downwardly through the plunger and hold seed upon the upper end of the plunger as the plunger moves upwardly, and a brush for dislodging seeds from the plunger and depositing the dislodged seeds into the throat actuated from the main shaft.

4. In a seeder, a carriage, a shovel for opening a furrow, a main shaft rotatably mounted transversely of the frame, a hopper, a throat leading from said hopper above the bottom thereof, a tube extending downwardly from said throat for depositing seed in the furrow back of the shovel, a plunger slidable vertically through the bottom of said hopper for lifting seeds from a mass of seeds in the hopper, a lever for shifting said plunger upwardly, a driven shaft rotated from the main shaft, a cam carried by said driven shaft for actuating said lever, said plunger being of tubular formation, a bellows, a flexible tube connecting said bellows with the lower end of the tubular plunger, a cam carried by the driven shaft and actuating said bellows in timed relation to movement of the plunger to create suction downwardly through the plunger and hold seed upon the upper end of the plunger as the plunger moves upwardly and force air through the plunger for clearing the plunger as the plunger moves downwardly, a rotary brush in said hopper for dislodging seed from the upper end of the plunger and depositing the seed in the throat, said brush being located over said plunger in position for engagement by the upper end of the plunger as the plunger moves upwardly, a shaft carrying said brush and rotatably mounted through the hopper, and means for transmitting rotation from the main shaft to the brush shaft.

5. In a seeder, a frame having side bars, a hopper over said frame, brackets carried by said side bars and supporting said hopper, a shovel between the side bars for opening a furrow, blades back of said shovel for scraping dirt into the furrow after deposit of seeds in the furrow, a rear wheel mounted between rear ends of the side bars for supporting the rear portion of the frame and packing dirt about covered seeds, a main shaft extending transversely of the frame and rotatably mounted through front ends of the side bars, a throat mounted through the rear wall of the hopper and extending downwardly, a tube leading from the lower end of said throat with its lower end terminating back of said shovel for depositing seeds in a furrow opened by the shovel, a tubular plunger slidable vertically through the bottom of said hopper for lifting seeds from a mass of seeds in the hopper, a brush for dislodging seeds from the upper end of said plunger and having a shaft extending through the hopper and rotatably mounted, means for transmitting rotary motion from the main shaft to the brush shaft, a collar about said plunger, a spring for urging the plunger downwardly coiled about the plunger with its lower end abutting said collar, a rod mounted transversely of said frame, a lever pivotally carried by said rod and having a forked rear end engaging under said collar, a driven shaft rotatably mounted transversely of said frame and driven from the main shaft, a cam carried by said driven shaft for engaging the front end of said lever and intermittently actuating said lever to raise the plunger, bellows, a tube connecting said bellows with the lower end of said plunger, and a cam carried by said driven shaft for operating said bellows.

LEE B. BUSHUE.

REFERENCES CITED

The following references are of record in the file of this patent:

UNITED STATES PATENTS

| Number | Name | Date |
|---|---|---|
| 243,276 | Lindsley | June 21, 1881 |

FOREIGN PATENTS

| Number | Country | Date |
|---|---|---|
| 258,480 | Italian | Apr. 27, 1928 |